Patented Sept. 23, 1930

1,776,550

UNITED STATES PATENT OFFICE

FRANK M. CLARK AND ARTHUR T. HARDING, OF PITTSFIELD, MASSACHUSETTS, ASSIGNORS TO GENERAL ELECTRIC COMPANY, A CORPORATION OF NEW YORK

OIL-PURIFICATION PROCESS

No Drawing. Original application filed October 29, 1928, Serial No. 315,921. Divided and this application filed December 18, 1929. Serial No. 415,115.

This application is a division of application Serial No. 315,921, filed October 29, 1928.

The present invention relates to the purification of mineral oil and is applicable both to crude oil and oil which has become oxidized by use. It is especially applicable to the preparation from crude oil of electrically insulating and impregnating oil, for example the oil which constitutes a cooling and insulating medium in such devices as electric transformers, capacitors, oil switches and electric cables, but is also applicable to mineral oil suited for lubricating or other purposes.

Crude oil and crude oil distillates which are obtained by the fractional distillation of petroleum, and hence are free from water but contain various substances, believed to be unsaturated hydrocarbons, or hydrocarbon derivatives, which would be very quickly oxidized during use of the oil to produce sludge and also acid and asphaltic bodies which would render the oil less efficient or entirely unfit for use. Mineral oils when containing such substances are more quickly broken down chemically during use and a dark sludge is formed which is less fluid than oil and in some cases may be semi-solid.

Heretofore, it has been usual practice to refine crude oil by treatment with sulphuric acid, thereby causing the oxidizable, or the oxidized products, to become sulphonated. The sulphonated products can be separated from the oil together with uncombined acid. This process is not only troublesome and wasteful of oil but also requires that great care should be taken to remove traces of free acid and acidic products from the oil which would be extremely deleterious during subsequent use of the oil. Our invention is also applicable to the purification of mineral oil which has become sludged by the presence of oxidation products during use in an electrical device or otherwise.

In accordance with our invention, mineral oils including both crude and sludged oil are purified by means of a polyhydric alcohol which is liquid at ordinary temperatures, as for example, glycerine, without the employment of sulphuric acid or other chemical additions.

In carrying out our invention, about 30 to 10 parts by volume of glycerine, or about 30 to 10 parts by volume of ethylene glycol, may be used as an extraction medium for 70 to 90 parts of crude or 70 to 90 parts of used sludge-containing mineral insulating oil. The oil and alcohol may be brought into intimate contact by agitation or otherwise. In some cases the extraction process may be repeated.

The purified oil may be separated from the glycerine, or other alcohol, containing the extracted impurities by withdrawing the alcohol and impurities after settling from the oil and if required the oil may be subsequently distilled to separate it from any small amounts of alcohol which may remain therein.

The process described and claimed herein is not concerned with the breaking of crude oil emulsions.

What we claim as new and desire to secure by Letters Patent of the United States is:

1. The process of removing deleterious hydrocarbon impurities from mineral oil which is substantially free from water which consists in extracting said impurities directly by means of polyhydric alcohol which is liquid at ordinary temperatures without intervening treatment with acids, and separating the purified oil from the alcohol and extracted impurities.

2. The step in the process of removing from crude mineral oil which is substantially free from water readily oxidizable substances which consists in extracting said substances by means of polyhydric alcohol, which is liquid at ordinary temperatures without intervening treatment with acid.

3. The process of removing from crude mineral oil substantially free from water substances which are readily oxidizable during use which consists in extracting said substances by means of glycerine, without intervening acid treatment.

4. The process of treating crude mineral oil which is substantially free from water and in an unacidulated state to remove impurities therefrom capable of readily producing sludge which consists in extracting such impurities by means of a polyhydric alcohol and then separating the purified oil from the mixture of alcohol which is liquid at ordinary temperatures and impurities.

In witness whereof, we have hereunto set our hands this 16th day of December, 1929.
FRANK M. CLARK.
ARTHUR T. HARDING.

CERTIFICATE OF CORRECTION.

Patent No. 1,776,550.     Granted September 23, 1930, to

FRANK M. CLARKE ET AL.

It is hereby certified that error appears in the printed specification of the above numbered patent requiring correction as follows: Page 2, line 9, claim 4, after the word "alcohol" insert "which is liquid at ordinary temperatures", and lines 11 and 12, strike out the words "which is liquid at ordinary temperatures"; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.

ing use which consists in extracting said substances by means of glycerine, without intervening acid treatment.

4. The process of treating crude mineral oil which is substantially free from water and in an unacidulated state to remove impurities therefrom capable of readily producing sludge which consists in extracting such impurities by means of a polyhydric alcohol and then separating the purified oil from the mixture of alcohol which is liquid at ordinary temperatures and impurities.

In witness whereof, we have hereunto set our hands this 16th day of December, 1929.

FRANK M. CLARK.
ARTHUR T. HARDING.

CERTIFICATE OF CORRECTION.

Patent No. 1,776,550.  Granted September 23, 1930, to

FRANK M. CLARKE ET AL.

It is hereby certified that error appears in the printed specification of the above numbered patent requiring correction as follows: Page 2, line 9, claim 4, after the word "alcohol" insert "which is liquid at ordinary temperatures", and lines 11 and 12, strike out the words "which is liquid at ordinary temperatures"; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.